US005745439A

United States Patent [19]

Nepple

[11] Patent Number: 5,745,439

[45] Date of Patent: Apr. 28, 1998

[54] COMBINED STOPWATCH AND PAGER

[75] Inventor: Bruce C. Nepple, Portland, Oreg.

[73] Assignee: Seiko Communications Systems, Inc., Beaverton, Oreg.

[21] Appl. No.: 720,893

[22] Filed: Oct. 3, 1996

[51] Int. Cl.[6] .............................. H04B 7/00; G04C 11/00

[52] U.S. Cl. ............................ 368/10; 368/101; 368/107; 368/47

[58] Field of Search .................................. 368/10, 47, 89, 368/101, 107–113

[56] References Cited

U.S. PATENT DOCUMENTS

| | | | |
|---|---|---|---|
| 4,786,902 | 11/1988 | Davis et al. | 368/11 |
| 5,406,272 | 4/1995 | Jang | 368/10 |
| 5,444,673 | 8/1995 | Mathurin | 368/63 |
| 5,469,411 | 11/1995 | Owen | 368/47 |
| 5,499,020 | 3/1996 | Motohashi et al. | 368/12 |

*Primary Examiner*—Bernard Roskoski
*Attorney, Agent, or Firm*—Elmer Galbi

[57] ABSTRACT

A paging device in combination with an accurate stopwatch includes a stopwatch timer block supported by latent processor element resources. The user directly manipulates, e.g., starts and stops, the timer block without processor element intervention. The processor element is thereby free to service higher priority tasks, e.g., receipt of paging information, and collects stopwatch timer block data at a lower priority level.

6 Claims, 4 Drawing Sheets

COMBINED STOPWATCH AND PAGER

FIELD OF THE INVENTION

The present invention relates generally to personal electronic devices, and particularly to paging devices and time measuring devices such as stopwatches.

BACKGROUND OF THE INVENTION

Paging devices typically include a processor element controlling reception of paging signals according to a given paging signal protocol. The processor element interacts with a radio receiver element when required to collect, store and present paging information to a user. The paging device must timely react to the particular paging signal protocol to reliably receive paging information. Collecting paging information is a high priority responsibility for the processor element.

For example, in one broadcast protocol the paging device constantly, or for given intervals, monitors a radio signal to detect in the radio signal transmission of an address corresponding to that particular paging device. The processor element must stand ready to immediately collect and store the radio signal paging information. Under a time-division multiplexed signal protocol, the processor element collects and stores paging signal information during particular time slots associated with that paging device.

Thus, there are times when the processor element must devote its resources to the high priority task of paging information collection and storage.

Paging devices typically include a set of user-operated buttons to support user-interactive paging device features. The user manipulates the buttons to access additional paging device functions including, for example, scanning through stored messages, deleting stored messages, or displaying time or date information. The processor element operates at very high speed relative to the user's need for such additional functions. Such other functions can be given lower priority relative to the paging information reception function. Even though the user requests by button operation an additional function, e.g., requests display of a stored message, the processor element completes any concurrent paging information reception function and responds to the user request without any significant delay from the user's perspective.

Paging devices, especially those incorporated into a wristwatch form, desirably include time measuring watch functions such as a stopwatch feature. A stopwatch feature, however, requires a highly responsive processor element, i.e., highly responsive to user-operated buttons commanding stopwatch operation. When the paging signal reception function takes highest priority, processor element services are potentially "latent" relative to the stopwatch functions, i.e., the processor cannot always respond immediately to activation of device buttons indicating a stopwatch command. Because the stopwatch desirably operates at relatively high resolution, e.g., measuring time intervals at 1/100th of a second resolution, the stopwatch function is potentially inaccurate due to potential processor element latency. A conflict arises, therefore, when incorporating a stopwatch feature into a paging device having high processor latency.

In traditional watches including a stopwatch function, the processor itself directly responds to user activation of device buttons and manipulates directly a timer reflecting the passage of time under the stopwatch function. The processor, however, has no higher priority tasks.

Accordingly, traditional watches including a stopwatch function have no processor latency problem and accurately reflect time intervals at relatively high resolution in response to user activation of device buttons.

It is desirable, therefore, to provide in a paging device accurate stopwatch features without sacrificing relatively higher priority tasks such as paging information reception and without incurring substantially higher manufacturing and device operating costs by devoting a second processor element to a stopwatch feature. The subject matter of the present invention addresses these concerns by combining a stopwatch function in a paging device having a single processor element while preserving both the accuracy of the stopwatch function and the reliability of the paging information reception function.

SUMMARY OF THE INVENTION

Under the present invention hardware elements intermediate the user-activated buttons and a timer element support operation of the timer element as a stopwatch in conjunction with latent processor support. The user directly controls the timer element without processor element intervention. The processor element subsequently reads latched values from the timer element when not occupied by higher priority tasks, e.g., when not collecting paging information. Processor element latency relative to the stopwatch function does not affect the accuracy of the stopwatch function.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
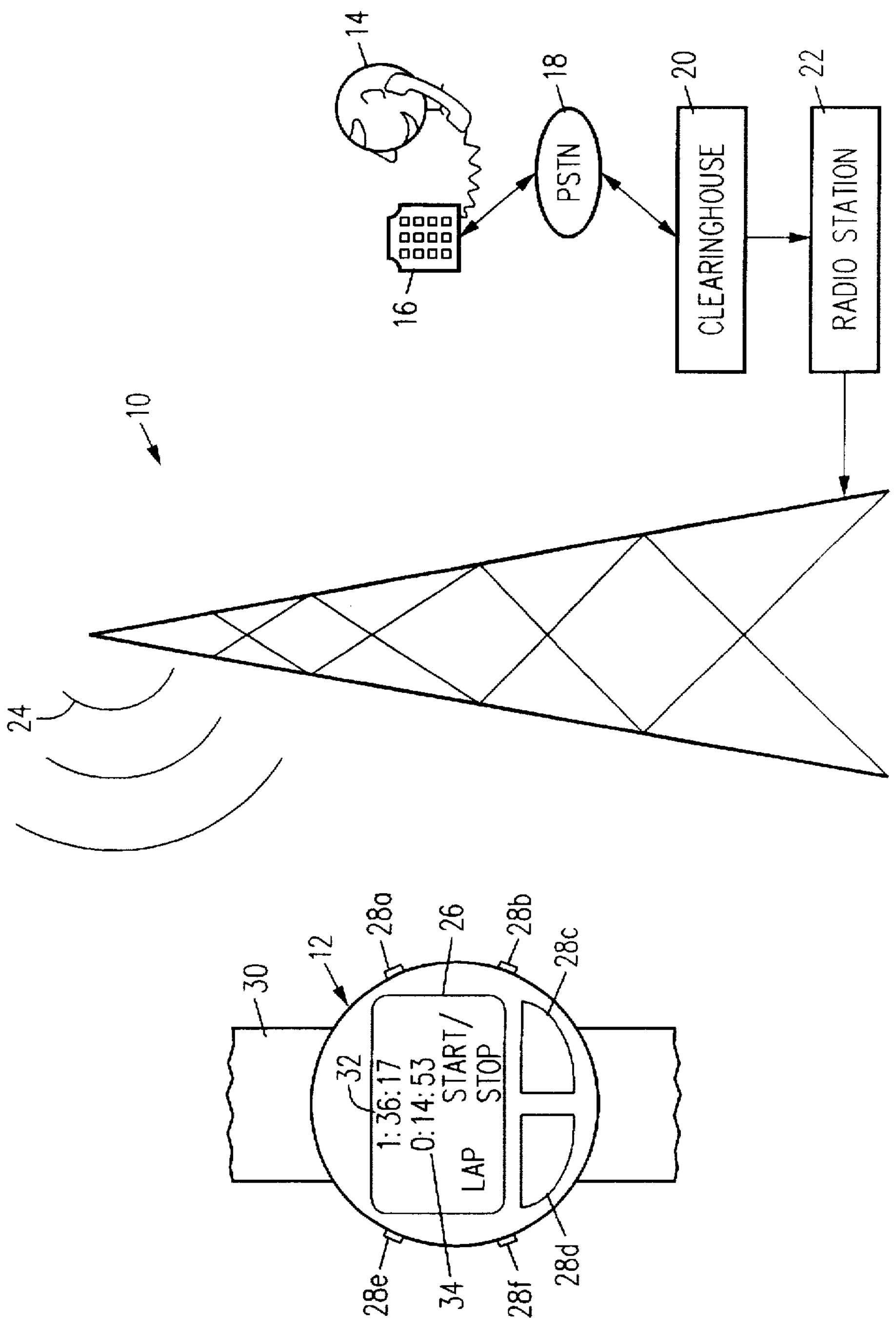
FIG. 1 illustrates a paging system including paging devices combining stopwatch and pager functions.

FIG. 1 illustrates a paging system 10 including a population of paging devices 12, one such paging device 12 being illustrated in FIG. 1. Paging devices 12 incorporate both paging and stopwatch features. Paging system 10 receives paging information from callers 14 interacting by telephones 16 through a public switch telephone network (PSTN) 18 with a clearinghouse 20. Clearinghouse 20 collects paging information from a variety of sources, e.g., callers 14, and submits such paging information to radio stations 22, one such radio station 22 being shown in FIG. 1. In addition to callers 14, paging system 10 collects paging information from other sources (not shown) such as stock information, weather information, sports information, and the like. In any event, paging system 10 transmits a radio signal 24 carrying paging information according to a given broadcast protocol. Paging devices 12 must monitor radio signal 24 and collect paging information when required.

In the illustrated embodiment, paging system 10 uses a time-division multiplexed transmission protocol wherein each paging device 12 activates its radio signal receiving circuitry during one or more assigned time slots. Generally, the processor element of each device 12 responds to a timed, highest priority interrupt to receive paging information from signal 24. Paging devices 12 take, therefore, as a highest priority task the activation of radio signal receiving circuitry and collection of paging information during particular time slots according to this time-division multiplexed protocol. Paging information addressed to paging device 12 is received and stored, and paging device 12 presents such information on its LCD display 26. Various paging-related features are implemented on each paging device 12 by user operation of buttons 28. In the illustrated embodiment, each paging device 12 includes six user-operable buttons 28, individually identified as buttons 28a–28f.

Paging devices 12, in the illustrated embodiment, take the form of a wristwatch and the wristband constitutes an antenna 30. Buttons 28 may be configured according to a variety of selected uses in implementation of paging-related functions, e.g., display stored messages, delete stored messages, lock stored messages against deletion, and the like.

In addition to paging-related functions, paging devices 12 also provide stopwatch functions. As illustrated in FIG. 1, the paging device 12 is in a stopwatch mode wherein LCD display 26 presents an elapsed time value 32 and a lap time value 34. Value 32 is an ongoing representation of elapsed time and value 34 represents elapsed time at the time of user-activation of a "lap" function. During stopwatch mode, paging device 12 presents values 32 and 34 and assigns particular stopwatch-related functions to certain ones of buttons 28.

In the illustrated example, button 28d assumes a "lap/reset" function and button 28c assumes a "start/stop" or toggle function. Once device 12 is running in stopwatch mode, value 32 continuously increments to represent an interval of elapsed time and value 34 represents the magnitude of value 32 at a time when the user activates the "lap" function, i.e., presses, button 28d when the stopwatch is running. If the user presses button 28d when the stopwatch is not running, value 32 is reset to zero. When the user activates button 28c, value 32 stops counting if presently counting and starts counting if presently not counting, i.e., toggles counter 100 operation.

Important to note, user activation of buttons 28c and 28d is displayed at high resolution, i.e., in 1/100th of a second resolution. Furthermore, by gating the higher resolution clock 106 and holding a partial count in prescale block 112, the resolution of time measurement by device 12 in response to buttons 28 is actually higher than 1/100th of 1 second. Despite this relatively high resolution, i.e., ability to react timely to user activation of buttons 28c and 28d, device 12 continues to reliably receive paging information from signal 24 according to the broadcast protocol, i.e., when needed according to the time-division multiplexed protocol. In other words, paging device 12 concurrently responds timely to both the user-activation of buttons 28c and 28d in use of stopwatch-related functions and to the paging system 10 transmission protocol. Both features, i.e., the stopwatch feature and the paging reception feature, operate reliably without interference relative to one another.

Figure 2:
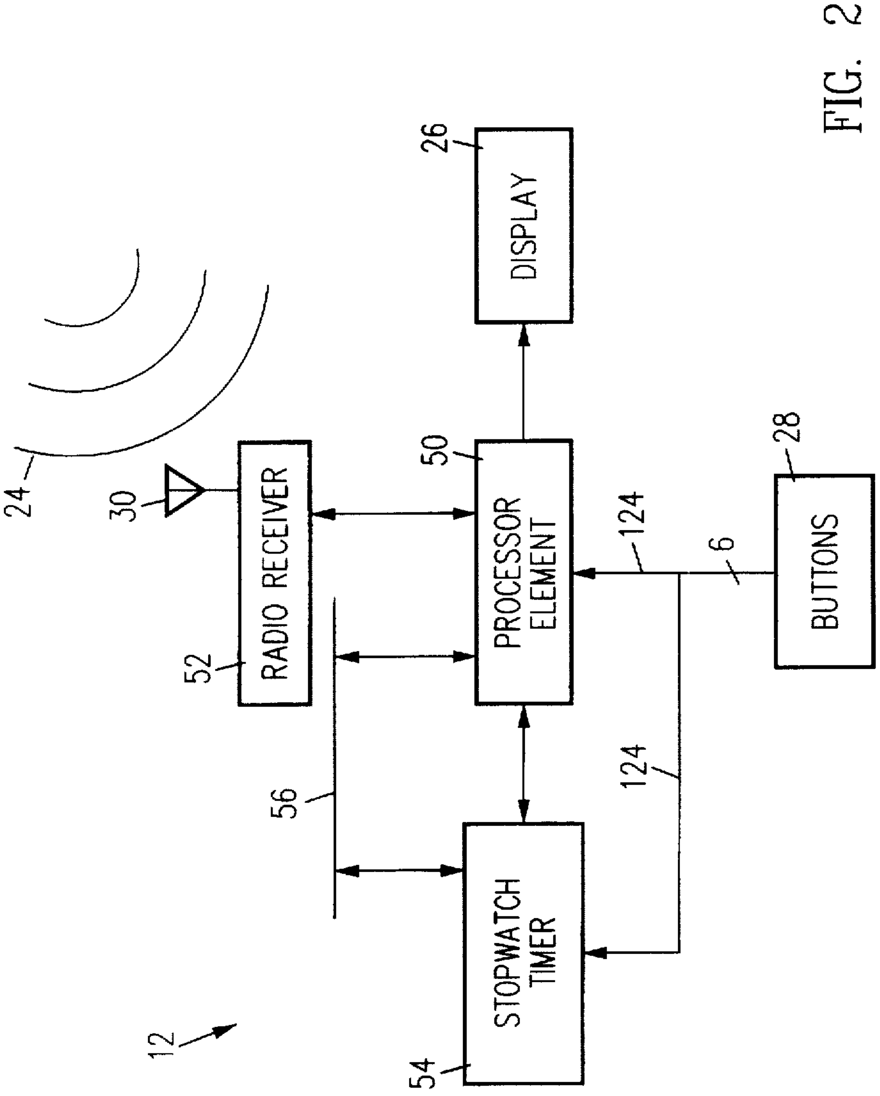
FIG. 2 illustrates in block diagram a paging device of the paging system of FIG. 1.

FIG. 2 illustrates in block diagram the paging device 12 of FIG. 1. In FIG. 2, a processor element 50 orchestrates generally operation of paging device 12. Processor 50 drives LCD display 26 for presentation of various information, e.g., paging information and stopwatch values 32 and 34. A radio receiver 52 couples to antenna 30 and receives radio signal 24. Processor element 50 interacts with radio receiver 52 to receive and store paging information obtained from radio signal 24. Processor element 50 monitors activation of buttons 28, but need not respond immediately. Processor element 50 also interacts with a stopwatch timer block 54 in implementation of the stopwatch functions of paging device 12. As described more fully hereafter, stopwatch timer block 54 monitors directly buttons 28 and measures stopwatch time intervals in implementation of the stopwatch functions of device 12. A bus 56 allows communication between processor element 50 and stopwatch timer block 54.

Figure 3:
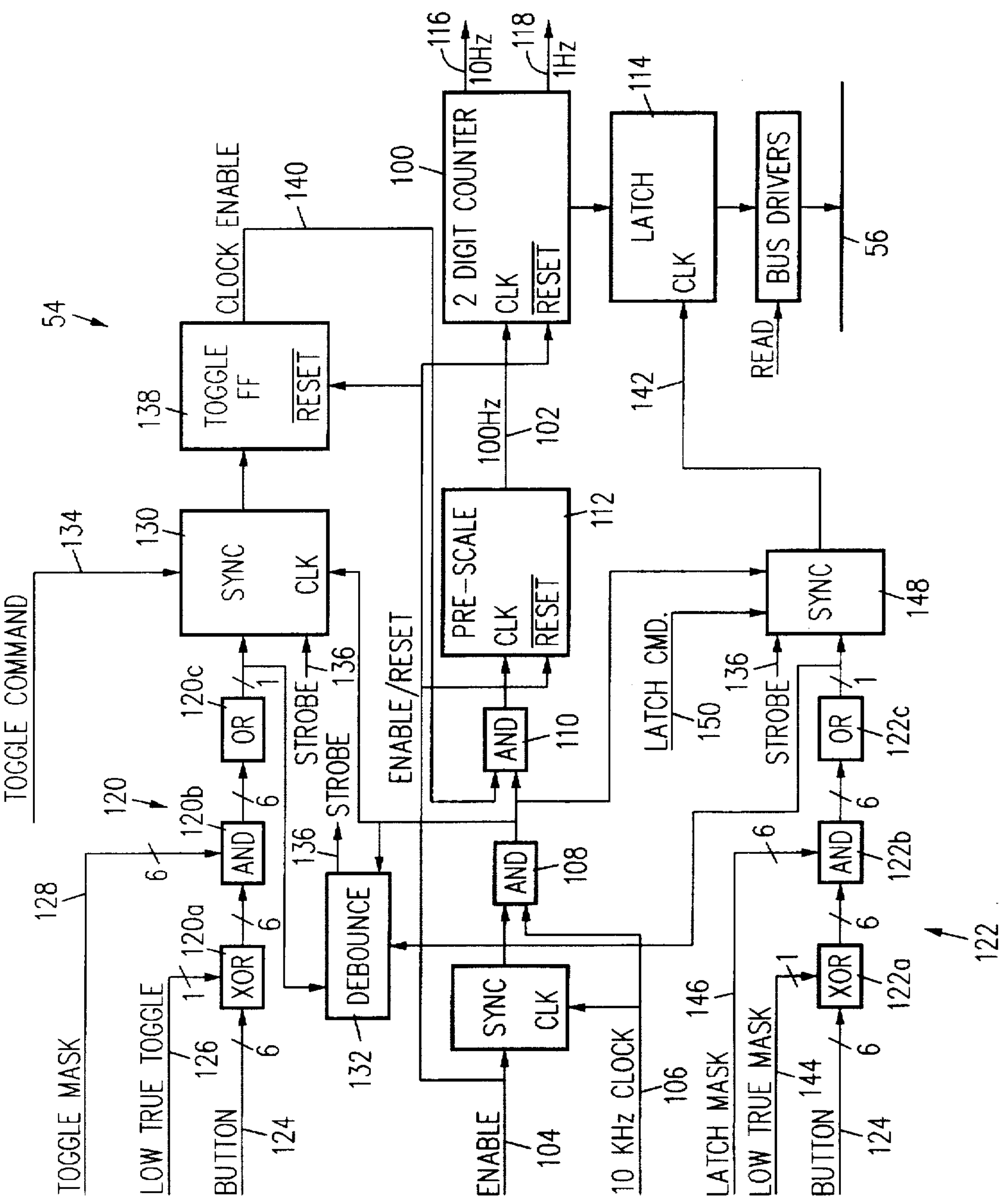
FIG. 3 illustrates in further detail a stopwatch timer block of the paging device of FIG. 2.

FIG. 3 illustrates in more detail by block diagram the stopwatch timer block 54 of FIG. 2. In FIG. 3, stopwatch timer block 54 includes a two decimal digit counter 100. Counter 100 receives and operates, i.e., counts, in response to a 100 Hz clock 102. An enable/reset signal 104 originates from processor element 50 (FIG. 2) to activate or reset counter 100, toggle flip flop 138, and prescale block 112. 100 Hz clock 102 originates from a 10 KHZ clock 106. Clock 106 passes serially through an AND gate 108 and through an AND gate 110 for application to a pre-scale block 112. Pre-scale block 112 divides by 100 the 10 KHz clock 106 to provide the 100 Hz clock 102. As may be appreciated, when the clock input from AND gate 110 to prescale block 112 stops, prescale block 112 holds a partial count which is later resumed when the clock from AND gate 110 resumes. Each of AND gates 108 and 110 provide opportunity to gate the relatively higher resolution 10 KHz clock as described more fully hereafter. Thus, two digit counter 100 operates when clock 102 is active at its input.

Counter 100 provides its current value to a latch register 114 and also produces a 10 Hz interrupt 116 and a 1 Hz interrupt 118. As explained more fully hereafter, interrupts 116 and 118 apply to processor element 50 and allow processor element 50 to update display 26 during stopwatch mode, i.e., show an ongoing elapsed time value 32 on display 26. Interrupts 116 and 118 are provided to processor element 50. When a measured time interval, e.g., a terminal value or a lap value, is to be displayed, processor element 50 obtains via latch 114 and bus 56 the actual value of counter 100 for display.

Stopwatch timer block 54 further includes button input selection logic 120 and button input selection logic 122. Generally, button input selection logic 120 allows the user to directly toggle operation of counter 100, i.e., start and stop counter 100. Input selection logic 122 allows the user to directly latch by operation of buttons 28 a value from counter 100 into latch 114.

Button input selection logic 120 selects which button 28, or combination of buttons 28, and what polarity, i.e., upon pressing or upon releasing of the selected button 28 or a combination of buttons 28, will toggle, i.e., start/stop, operation of counter 100. Thus, one or a combination of buttons 28 will toggle operation of counter 100 either upon first establishing such condition, i.e., pressing the button 28 or combination of buttons 28, or upon releasing the button 28 or combination of buttons 28. Similarly, button input selection logic 122 allows a given button 28 or combination of buttons 28 to latch a value from counter 100 upon pressing or upon releasing such button 28 or combination of buttons 28.

Important to note, the user accomplishes by operation of buttons 28 direct immediate manipulation of the counter 100 and latch 114. Processor element 50 need not intervene to accomplish immediate manipulation of counter 100 or the latching of a value from counter 100. As may be appreciated, an ability to toggle operation of counter 100, i.e., start or stop counter 100, and an ability to latch a value from counter 100 while allowing counter 100 to continue counting supports a wide variety of higher level, i.e., user level, functions in implementation of a stopwatch feature for paging device 12.

Logic 120 is configured to establish a button 28 condition representing a "start/stop", i.e., toggle, function for the stopwatch display. For example, pressing button 28c may be used as a "start/stop" command. Logic 120 includes an exclusive OR gate 120a receiving a 6-bit button signal 124 representing the state of buttons 28. Exclusive OR block 120a also receives a 1-bit "low true toggle" signal 126. Block 120a provides its 6-bit output to an AND block 120b also receiving a "toggle mask" signal 128. AND block 120b provides its 6 bit output to an OR block 120c. The 1-bit output of OR block 120c represents user activation of buttons 28 meeting a given state, e.g., pressing button 28c, representing a "start/stop" command for the stopwatch timer function. This 1-bit output of OR block 120c is applied to a synchronization block 130 and to a debounce block 132. Synchronization block 130 also receives a toggle command 134 from processor element 50.

Debounce block 132 times the state of button signal 124 to eliminate false triggers due to mechanical vibrations. The debounce block 132 monitors both pressing and releasing of buttons 28. When the button signal 124 is constant for a given fixed interval, e.g., 52 milliseconds, debounce circuit 132 presents a strobe signal 136. Synchronization block 130 receives strobe signal 136 and drives a toggle flip flop (FF) block 138. Flip flop block 138 produces a clock enable output 140 for application to AND gate 110. In this manner, a given state of buttons 28, including reference to a press condition or a release condition, provides a basis for gating application of 10 KHz clock 106 to the prescale block 112. More particularly, the clock enable signal 140 selectively gates the higher resolution clock 106 to prescale block 112 which in turn operates counter 100. Toggle flip flop block 138 also receives as a reset signal the enable signal 104.

Button selection logic 122 is similarly constructed, but has as its purpose application of a latch signal 142 to latch 114, thereby capturing in response to a given button 28 state, the current value of counter 100, e.g., to implement a "lap" function or to implement a terminal value display function for the stopwatch display. Thus, logic 122 includes an exclusive OR block 122a receiving the button signal 124 and also receiving a 1-bit "low true mask" signal. The AND block 122b receives a 6-bit "latch mask" signal and provides its 6-bit output to the OR block 122c. OR block 122c provides its 1-bit output to a synchronization block 148, similar to synchronization block 130, and to the debounce block 132. Synchronization circuit 148 also receives the strobe signal 136 as representation that the button signal 124 has been stable for the fixed period of time, e.g., 52 milliseconds. Synchronization block 148 also receives a latch command 150 from processor element 50.

Latch command 150 and toggle command 134 provide a mechanism for processor element 50 to override stopwatch operation by directly latching or directly toggling the counter independent of user activation of buttons 28.

Thus, stopwatch timer block 54 provides an ongoing partial-second count in prescale block 112 and the two digit counter 100. The prescale block 112 and the two digit counter 100 may be enabled and thereafter begin counting by application of the clock 106. The state of toggle flip flop block 138 determines whether or not clock signal 106 is applied to prescale block 112, i.e., by gating at the AND gate 110. As counter 100 operates, it provides to processor element 50 (FIG. 2) the 10 Hz interrupt 116 and the 1 Hz interrupt 118. Processor element 50 reacts to interrupt 116 by appropriately updating elapsed time value 32 on display 26. Each time the 1 Hz interrupt 118 occurs processor element 50 increments a seconds value in its internal register reflecting whole seconds, whole minutes, and whole hours. However, once the user has activated the "stop" or "lap" function relative to the counter 100, the actual counter 100 value is taken from counter 100 via latch 114 and bus 56 and the processor element 50 internal register holding whole seconds, whole minutes, and whole hours is copied for accurate display.

Each time the 10 Hz interrupt 116 occurs, processor element 50 latches and retrieves a value from counter 100 for display of value 30. Because the 1/100th display portion of value 130 operates at speeds too fast for human perception, this value may simply be given for display purposes a random value during counting by counter 100.

The whole second, whole minute, and whole hour values are managed independently by processor element 50. Because processor element 50 always timely responds to the 1 Hz interrupt 118, i.e., will always respond to interrupt 118 within one second, the whole second, whole minute, and whole hour values are accurately maintained by processor element 50 independent of stopwatch timer block 54. Stopwatch timer block 54 accurately displays time intervals indicated by user operation of buttons 28, i.e., accurate to within 1/100th of 1 second and thereby supports a stopwatch feature in conjunction with latent processor element support.

Figure 4:
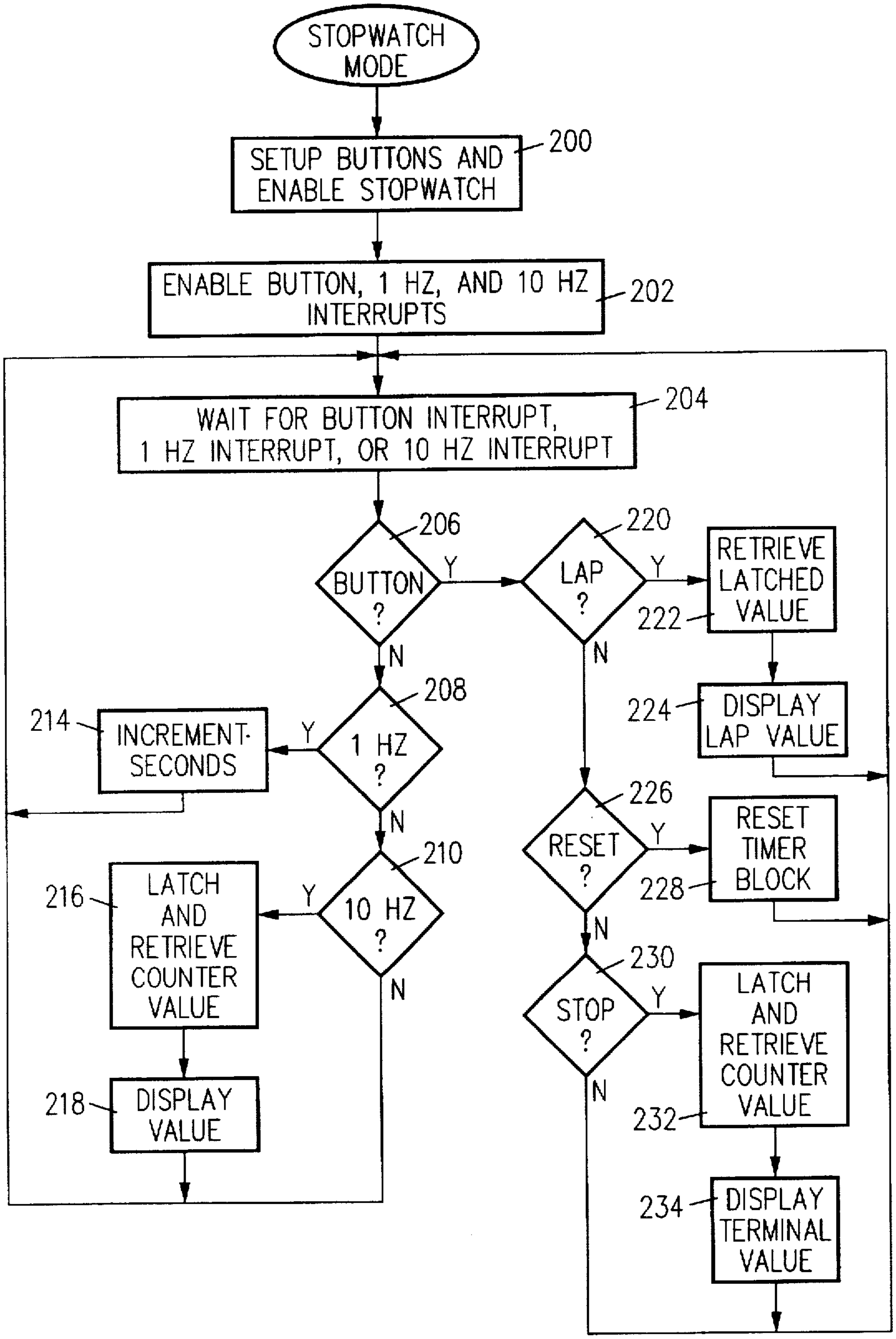
FIG. 4 illustrates by flow chart operation of a processor element block of the paging device of FIG. 2 managing stopwatch functions in accordance with the present invention.

FIG. 4 illustrates programming for processor element 50 relative to user activation of the stopwatch mode for paging device 12. In FIG. 4, once a user enters stopwatch mode, processor element 50 in block 200 configures the button input selection logic 120 and logic 122, i.e., applies the toggle mask value 128, low true toggle value 126, latch mask value 146, and low true mask value 144. This establishes conditions required at buttons 28, i.e., designates a button 28 or combination of buttons 28 and a polarity therefor, required to cause toggling (logic 120) of counter 100 and prescale block 112 operation or to cause latching (logic 122) of a value from counter 100. Processor element 50 also applies the enable signal 104 to reset or allow operation of prescale block 112 and counter 100, i.e., sets prescale block 112 and counter 100 to zero and allows application of clock 106 to prescale block 112.

Continuing to block 202, processor element 50 then enables several interrupts required to support stopwatch operation. As illustrated, processor element 50 enables a button interrupt detecting activity at buttons 28, the 1 Hz interrupt 118, and the 10 Hz interrupt 116. In block 204 processor element 50, with respect to stopwatch timer programming, waits for occurrence of the button interrupt, 1 Hz interrupt 118 or the 10 Hz interrupt 116. As may be appreciated, the programming of FIG. 4 can be interrupted to service the higher priority interrupt that triggers reception of paging information.

Upon presentation of a stopwatch-related interrupt, processor element 50 advances from block 204 to a series of decision blocks 206, 208, and 210. At decision block 206, if the button interrupt has occurred then processing branches from decision block 206 as described hereafter. If decision block 208 indicates occurrence of the 1 Hz interrupt 118, then processor element 50 increments in block 214 a seconds value in its internal registers (not shown) devoted to maintaining elapsed time for the stopwatch function and processing returns to block 204. As may be appreciated, incrementing a seconds value in such processor element 50 register may cascade additional modification to higher order digits as necessary to accurately reflect passage of whole seconds, whole minutes, and whole hours. If decision block 210 indicates occurrence of the 10 Hz interrupt 116, then processing branches to block 216 where processor element 50 latches by command 150 (FIG. 3) the counter 100 and retrieves via bus 56 the latched counter 100 value. In block 218, the processor element 50 updates value 32 on display 30 and processing returns to block 204.

It is noted that the interrupt service routines executed upon exiting block 204 must take care to avoid race conditions caused by the 1 Hz interrupt (118).

a) Block 210 must always execute after block 208 as shown in FIG. 4.

b) Block 222 must determine whether the 1 Hz interrupt 118 is active, and if so determine whether the 1 Hz interrupt 118 occurred before or after the button press (**28*d*) that latched 114 the two digit counter 100**. That determination can be made by examining the retrieved latched value. If the value is greater than 0.5 seconds, it can be assumed the interrupt occurred after the button press that latched the data, and vice versa.

c) Block 232 must examine the 1 Hz interrupt. If the 1 Hz interrupt is active, the seconds must be incremented before they are displayed.

Returning to decision block 206, processor element 50 responds to a "lap" command, a "reset" command or a "stop" command previously issued by the user via buttons 28. Decision block 220 detects, in the illustrated example, activation of button **28*d* when counter 100 is active. Processor element 50 responds by retrieving in block 22 the value previously latched by user operation of buttons 28. In block 224, processor element 50 updates the lap value 34 on display 30 and processing returns to block 204. If the user has activated the "reset" command, i.e., pressed button 28*d* when counter 100 is not running, then processing branches from decision block 226 to block 228 where processor element 50 applies the reset/enable command 104 to stopwatch timer block 54 and processing returns to block 204. As may be appreciated, in connection with resetting timer block 54 as indicated in block 228, processor element 50 also resets its internal registers used to reflect whole seconds, whole minutes, and whole hours associated with the stopwatch feature. If the user has issued a "stop" command, i.e., pressed button 28*c* when counter 100 is running, then processing branches at decision block 230 where in block 232 processor element 50 latches the current value of counter 100 by means of the latch command 150 (FIG. 3) and retrieves the latched value via bus 56. Important to note, the value then held in counter 100 reflects accurately the time at which the user initiated the "stop" command by pressing button 28*c*. Processing then continues to block 234 where processor element 50 displays a terminal value 32 and processing returns to block 204**.

Thus, a paging device incorporates an accurate stopwatch function without sacrificing any high priority task, i.e., without sacrificing the primary function of retrieving paging information according to a given broadcast protocol. The processor element supports the stopwatch function in a latent fashion, i.e., need not respond immediately to user activation of stopwatch related button activity. The user controls directly the stopwatch timer block, and thereby accurately measures time intervals.

It will be appreciated that the present invention is not restricted to the particular embodiment that has been described and illustrated, and that variations may be made therein without departing from the scope of the invention as found in the appended claims and equivalents thereof.

What is claimed is:

1. In combination a paging device and a stopwatch, the combination comprising:

user operable buttons;

a radio signal receiver;

a processor element interactive with said radio signal receiver to receive paging information according to a given paging information broadcast protocol, said processor element receiving said paging information according to a first priority level; and a stopwatch timer including a counter and control circuitry independent of said processor element, said control circuitry being responsive to at least one of said user operable buttons to control operation of said counter, said processor element obtaining for display a time value originating from said counter according to a second priority level less than said first priority level.

2. A combination according to claim 1 wherein said control circuitry gates a clock signal applicable to said counter.

3. A combination according to claim 1 wherein said counter provides at least one interrupt signal to said processor element and said processor element services said at least one interrupt to provide a display of time.

4. A combination according to claim 1 wherein said stopwatch timer includes a latch register coupled to said counter and said latch register receives a current value of said counter in response to user operation of said user operable buttons without intervention of said processor element.

5. A combination according to claim 4 wherein said processor element obtains for display said time value from said latch register.

6. In a paging device including a processor element, user operable buttons, and a radio signal receiver, the processor element and radio signal receiver interacting at a given priority level to receive paging information according to a given broadcast protocol, an improvement comprising:

a stopwatch timer interacting with said processor element at a second priority level less than said given level, said stopwatch timer block including a counter and including button input logic coupled to said user operable buttons whereby user operation of said buttons causes without intervention of said processor element at least one of starting, stopping, or latching said counter.

* * * * *